June 15, 1965     E. BRICHARD ETAL     3,189,424
AUTOMATIC CUTTING AND DISCHARGING OF A CONTINUOUS
VERTICALLY DRAWN GLASS RIBBON Filed Dec. 22, 1960     6 Sheets-Sheet 4

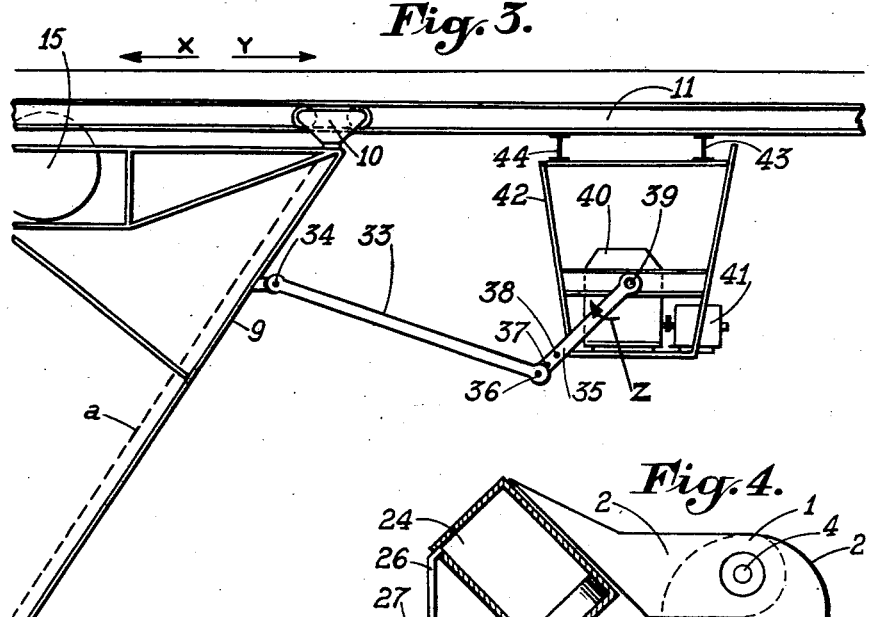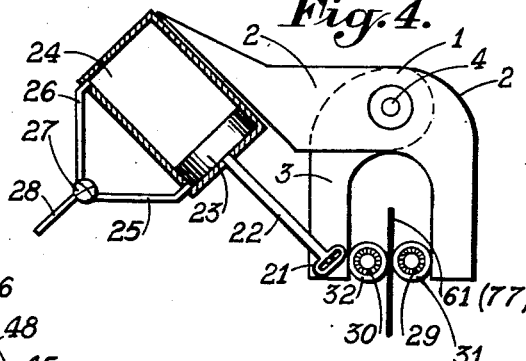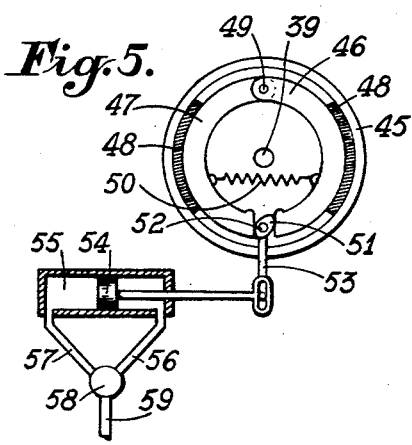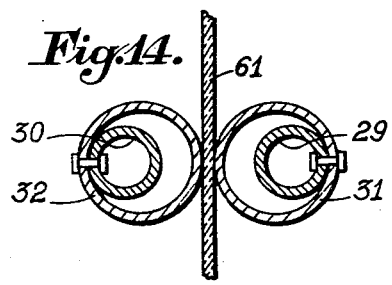

INVENTORS
EDGARD BRICHARD
JEAN MARCHAND

*Fig. 7.*
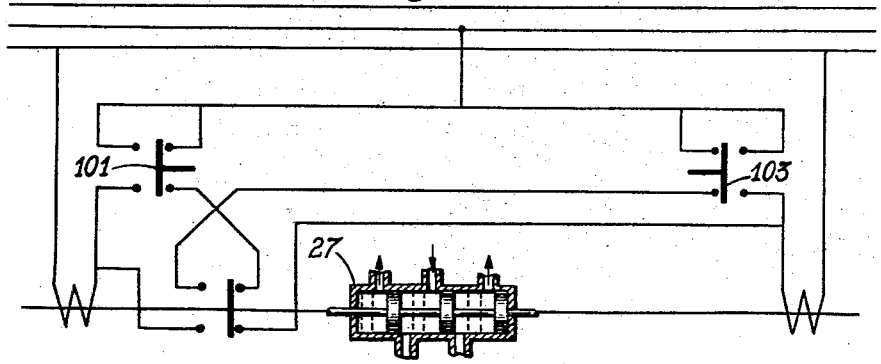
*Fig. 8.* *Fig. 9.* *Fig. 12.* *Fig. 13.*
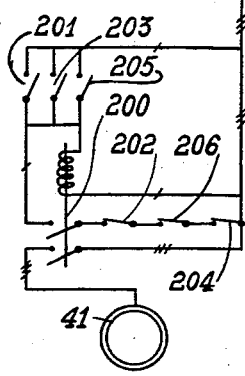 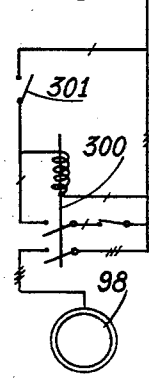 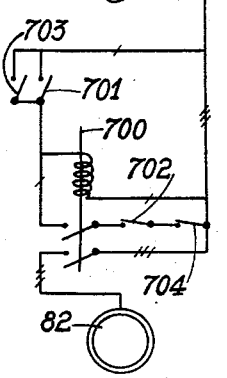 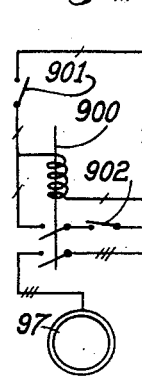
*Fig. 11.*
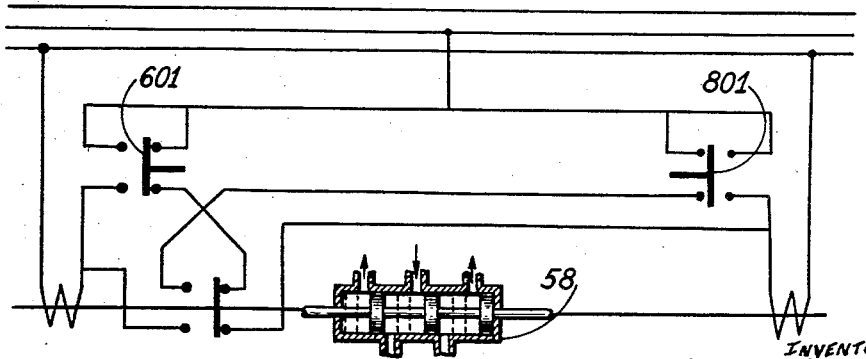

June 15, 1965  E. BRICHARD ETAL  3,189,424
AUTOMATIC CUTTING AND DISCHARGING OF A CONTINUOUS
VERTICALLY DRAWN GLASS RIBBON
Filed Dec. 22, 1960  6 Sheets-Sheet 6

INVENTORS
EDGARD BRICHARD
JEAN MARCHAND
BY
Corey, Hart & Stemple

United States Patent Office 3,189,424
Patented June 15, 1965

3,189,424
AUTOMATIC CUTTING AND DISCHARGING OF A CONTINUOUS VERTICALLY DRAWN GLASS RIBBON
Edgard Brichard, Jumet, and Jean Albert Marchand, Charleroi, Belgium, assignors to Union des Verreries Mecaniques Belges Societe Anonyme, Charleroi, Belgium, a company of Belgium
Filed Dec. 22, 1960, Ser. No. 77,555
Claims priority, application Belgium, Mar. 23, 1960, 467,536, Patent 588,952
16 Claims. (Cl. 65—160)

The present invention relates to a method of and an installation for automatically cutting into sections of predetermined dimensions a continuous glass ribbon leaving a vertical drawing machine, and for automatically discharging the sections thus obtained as they are detached from the ribbon.

The method according to the invention is characterised mainly in that:

(a) A continuous glass ribbon leaving a vertical drawing machine is automatically taken up by its edge, urged upwards by a pull adapted to the drawing speed, slightly bent over towards the cutting tool during the scoring of the cutting line, cracked off by a bend in the opposit direction to the previous bend, and discharged in the vertically suspended condition to stations for subsequent treatment;

(b) The discharge of the glass sheet section obtained inaccordance with (a) in automatically effected by a lateral translational movement of the vertically suspended section of glass ribbon, progressive stopping of the lateral translational movement of the section, release of the section brought into a tiltable position, tilting of the section to bring it into a more or less horizontal position and displacement of the more or less horizontal section in the direction of its own plane.

The installation according to the invention is characterised mainly by;

(a) A gripping device so mounted as to be vertically displaceable in a horizontally displaceable frame, a device combined with the gripping device and serving for automatically closing and opening it, a device mounted on the frame and serving for the vertical displacement of the gripping device in the frame and a device serving for the horizontal displacement of the frame with the gripping device and with the control of the latter;

(b) A resilient locking device provided on the jaws of the gripping device according to (a);

(c) An automatic braking device, combined with the device serving for the horizontal displacement of the frame according to (a);

(d) A tilting table mounted downstream of the frame comprising the gripping device according to (a), (b), (c) combined with an automatic control device adapted to maintain the tilting table in a slightly inclined position in relation to the vertical, to receive the cracked-off glass sheet section, and to bring the table with the said section into a substantially horizontal position by tilting;

(e) A belt conveyor provided with a control device and arranged to co-operate with the table according to (d) in such manner that when the latter reaches with the cracked-off glass sheet section a more or less horizontal position the said section is raised by the conveyor belts of the tilting table and discharged to a station for subsequent treatment or manipulation;

(f) An electrical and/or pneumatic and/or hydraulic or combined, connecting and control system adapted to effect interdependent automatic operation of the devices according to (a) and (e).

A constructional form of an installation for carrying out the method of the invention is diagrammatically illustrated in the accompanying drawings, in which:

FIGURE 3 is a fragmentary side view of the gripping device according to FIGURE 1 and of the control device by which the said gripping device is displaced from its position above the vertical drawing machine towards the tilting device and vice versa;

FIGURE 4 is a side view to a larger scale showing the clamp of the gripping device, and the device actuating one of the jaws of the said clamp;

FIGURE 5 is a side view to a larger scale of a braking device co-operating with the device controlling the gripping device according to FIGURE 3;

FIGURE 6 is a side view of the tilting device and of the conveyor device co-operating with the gripping device according to FIGURES 1 to 3;

Figure 1:
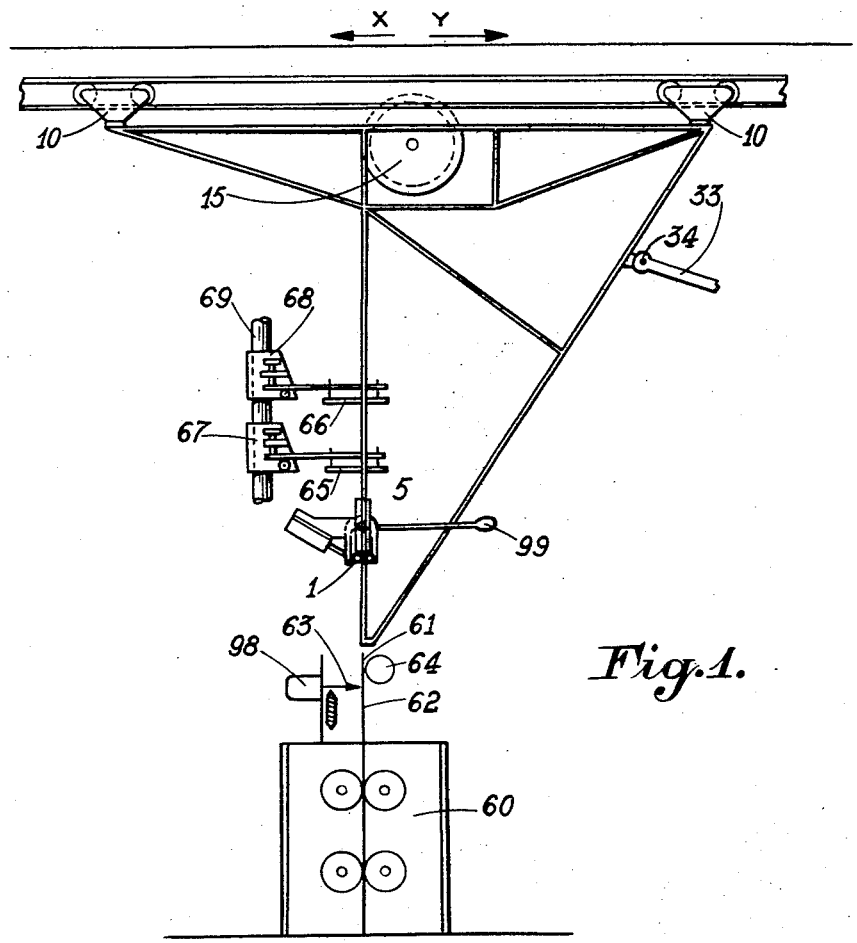
FIGURE 1 is a side view of the gripping device and of the upper end of a vertical drawing machine, of a part of a gauge, for example of automatic form, and of the cutting tool with which the said gripping device co-operates.

FIGURES 7 and 11 are circuit diagrams of the electropneumatic control of the device actuating one of the jaws of the clamp and of the electropneumatic control of the braking member co-operating with the device controlling the gripping device according to FIGURE 3, FIGURES 8, 9, 10, 12 and 13 are circuit diagrams of the electrical connections of the motors of the device controlling the frame of the gripping device, of the cutting device, of the control device displacing the clamp of the gripping member in the upward and downward directions in the said frame, of the tilting device and of the conveyor device, respectively, and FIGURE 14 is a transverse section to a larger scale through the jaws of the clamp of the gripping device and through the glass sheet gripped between the said jaws.

The gripping device comprises essentially a clamp 1 (FIGURES 1, 2 and 4) of which the jaw 2 is fixedly mounted and the jaw 3 pivotally mounted on a rod 4 whose ends are fast with sliding members 5 and 6 respectively, for example in the form of sleeves, which are adapted to slide on vertical rods 7 and 8 respectively of a frame 9 which is in turn displaceable through carriages 10 mounted on rollers, in the direction of the arrows $x$, $y$ on fixed horizontal rails 11 and 12 respectively, the rod 4 supporting the clamp 1, 2, 3 being suspended through cables or chains 13, 14 from the pulleys 15, 16 mounted on a shaft 17 of a reduction gear 18 controlled by an electric motor 19, preferably of variable speed, which is adjustable in accordance with the speed at which the glass ribbon is drawn, for example an asynchronous three-phase slip-ring motor arranged to adapt itself automatically to the various drawing speeds by rotor slip, the reduction gearing 18 and the motor 19 being mounted on a platform 20 forming part of the frame 9.

The jaw 3 of the clamp 1 pivotally mounted on the rod 4 is pivotally connected at its other end at 21 (FIGURE 4) to an end of a rod 22 provided with a piston 23, the latter being adapted to slide in a cylinder 24 fast with the fixed jaw of the clamp and connected by the conduits 25, 26 to a five-way electromagnetic valve 27 which is connected on the other hand to a conduit 28 for the supply of fluid under pressure, for example compressed air.

The inner gripping faces of the jaws 2 and 3 of the clamp 1 are advantageously lined with shock absorbers adapted to adsorb shocks at the closing of the clamp and thus to prevent breakage of glass, the said shock absorbers each consisting, for example, of a steel tube 29, 30 fixed to the respective jaws and covered by a rubber tube 31, 32, which rubber tubes may have an internal diameter slightly larger than the external diameter of the steel tubes 29, 30, so as to enclose in the space thus defined between the tubes 30 and 32, 29 and 31, a volume of air which can be compressed and thus add its damping effect to that of the rubber tubes 31, 32. In this case, the rubber tube 31, 32 is fixed to the corresponding steel tube 29, 30 along the generatrix opposite to those coming into contact with the sheet section 61 to be gripped (see FIGURE 14).

The gripping device 1 to 32 hereinbefore described is displaceable in the direction of the arrows $x$ and $y$ by means of a control means consisting, for example, of a correcting rod 33 pivotally connected at one end to the frames 7, 8, 9, 20 at 34 and at the other end to a crank 35 at a point 36, 37, 38 variable at will, the said correcting rod being in turn mounted on the shaft 39 of a reduction gear 40 controlled by an electric motor 41 the latter and the reduction gear 40 being mounted on a hanger 42 fixed to the rails 11, 12 through girders 43, 44.

Also mounted on the shaft 39 of the reduction gear 40 is a brake of any appropriate type, for example comprising a drum 45 (FIGURE 5), of which the blocks 46, 47 provided with a lining 48 and pivotally connected at a fixed point 49 and maintained in the released position by a spring 50 can be locked against the inner peripheral face of the drum 45 with the aid of a cam 51 mounted on a shaft 52 actuated through a crank 53 with the aid of a piston 54 displaceable in a fixed cylinder 55 connected by the conduits 56, 57 to a five-way electromagnetic valve 58 connected on the other hand to to a conduit 59 for the supply of a fluid under pressure, for example compressed air.

Figure 2:
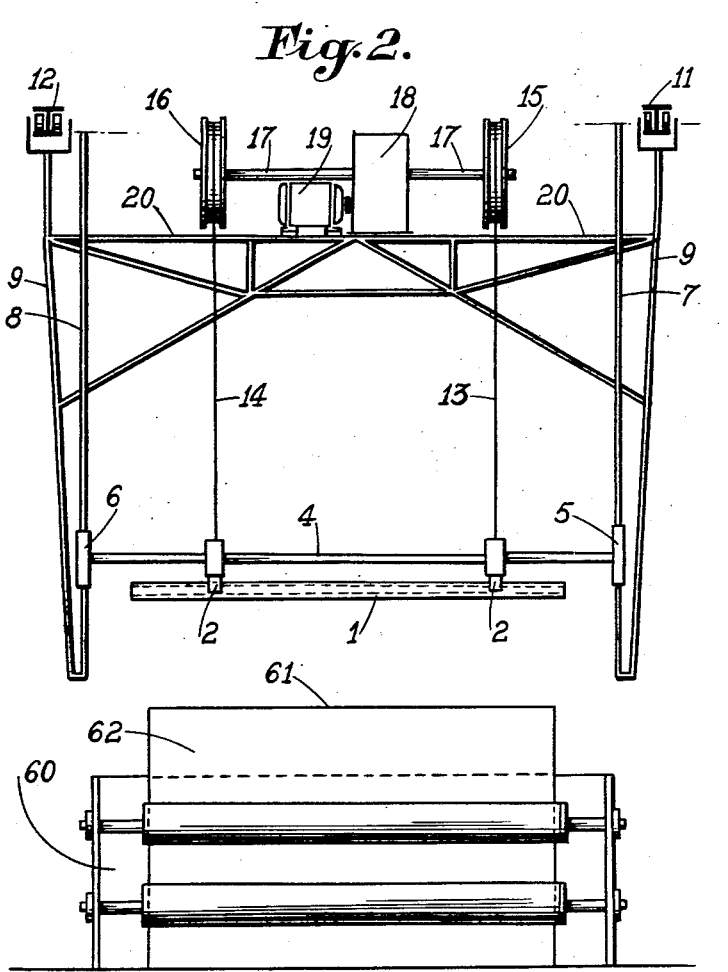
FIGURE 2 is a front view of the gripping device and of the upper end of the vertical drawing machine according to FIGURE 1, the gauge and the cutting tool having been omitted from the drawing for the sake of clarity.
Figure 10:
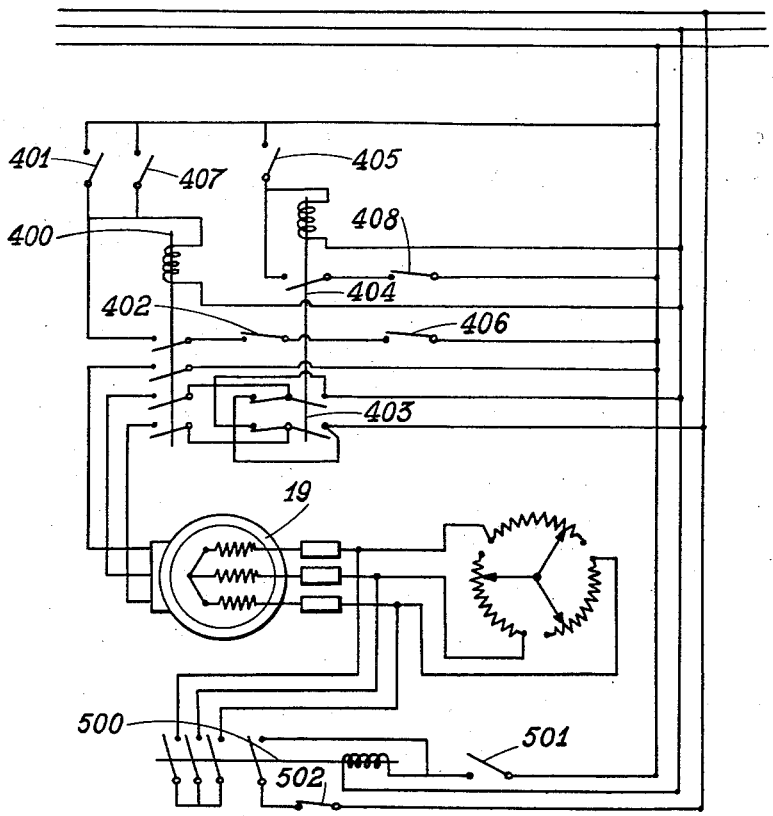

When the gripping device 1 to 32 occupies its initial or inoperative position (see FIGURE 3), in which it is several centimetres from the left-hand dead centre of its stroke in the direction of the arrow $x$, this left-hand dead centre position being denoted by the chain line $a$, the open clamp 1, 2, 3 is situated above the vertical drawing machine 60 (FIGURE 1) in the path of the section 61 of the glass ribbon 62 rising from the drawing machine 60 and passing between the cutting device 63 (which may be of the type according to Patent No. 497,927) belonging to the proprietors of the present invention and the cracking-off roller 64, while the cutting device 63 may be combined with an automatic gauge according to Patent No. 562,702 belonging to the proprietors of the present invention, which gauge is partially and diagrammatically represented in FIGURE 1 by two superposed abutments 65, 66 adapted to pivot on supports 67, 68 adjustably fixed to the rod 69 of the gauge, which is in turn axially displaceable and adapted to be held fast in any desired position corresponding to the length of the sections to be detached by the cracking-off of the glass ribbon 62.

The tilting device (FIGURE 6) consists essentially of a table 70 composed of a series of parallel girders 71 fixed at one of their ends, at an appropriate lateral distance from one another, to a horizontal cross member 72 provided with cheeks 73 articulated to two horizontal pivots 74 fast with a fixed support 75, so that the table 70–73 is capable of tilting about the pivots 74 in the vertical plane of the movement of the frame 1 to 32 in the direction of the arrows $x$, $y$. The table 70 is provided with a lug 76 forming a bearing member adapted to receive the section 77 of glass ribbon, when the said section is deposited thereon by the clamp 1, 2, 3 on opening of the latter.

The table 70 is connected by a connecting rod 78 to a crank 79 fixed to the shaft 80 of a reduction gear 81 controlled by an electric motor 82.

The conveyor device (FIGURE 6) consists essentially of a frame 83 in the form of a table, the top of which is formed of the upper runs of a series of parallel endless belts 84 travelling over series of pulleys 85, 86 and 87, 88 fixed respectively at an appropriate lateral distance apart on the shafts 89–90 and 91, 92 mounted on the frame 83, the shaft 89 also supporting a pulley 93 controlled with the aid of a belt or chain transmission system 94 through a pulley 95 of a reduction gear 96 which is in turn controlled by an electric motor 97.

The arrangement of the upper runs of the belts 84 is such that when the tilting table 70 reaches its horizontal position its girders 71 are situated between the upper runs of the belts 84, and these runs are disposed slightly above the surface of the table 70, on which the cracked-off sheet 77 rests, so that the latter is carried away from the table 70 towards a station for a subsequent operation by the conveyor belts 84 as soon as the latter are moved by the motor 97.

The conveyor device 83 to 97 hereinbefore described may in addition be combined with an automatic scoring device, for example according to Patent Nos. 458,032, 458,267, and 458,290, belonging to the proprietors of the present invention, notably for scoring cutting lines parallel to the direction of movement of the upper runs of the belts 84.

The gripping, tilting and conveying devices hereinbefore described are combined with an electric control and connecting system (FIGURES 7 to 13) ensuring automatic operation of the installation, which do not require the intervention of any operator except when it is necessary to change the dimensions of the sections to be detached from the glass ribbon, this control and connecting system comprising, for example:

A running button 101 (FIGURE 7) situated in an adjustable position in the path of the section 61 of the glass ribbon 62, so as to actuate the five-way electromagnetic valve 27 of the clamp 1 in the direction of the closing of the latter and thus to initiate the gripping of the section 61 of the glass ribbon 62 rising from the drawing chamber when this section is situated at an appropriate height in its upward travel;

A contactor 400 (FIGURE 10), of which a running button 401 is situated in an adjustable position in the path of the clamp 1 (or of the section 61 of the glass ribbon 62), and is actuated by the clamp, driven upwards by the section 61, so as to start the motor 19 and thus to initiate an upward pull on the section 61, this pull adapting itself to the speed of the upward movement of the glass ribbon;

A contactor 200 (FIGURE 8), of which the running button 201, situated on the lower abutment 65 of the gauge 69, and the stop button 202, situated in the path of the frame 9 (or in the path of the crank 35), are successively actuated in such manner as to place in circuit for a short period the motor 41, which produces a movement of the frame 9 carrying the clamp 1 from the inoperative position to the position $a$ (FIGURE 3), from which corresponds to a small lateral displacement, of short duration, of the section 61, on the side of the cutting tool 63, and consequently a slight bending of the glass ribbon 62 towards the tool;

A contactor 300 (FIGURE 9), which the running button 301 is disposed on the upper abutment 66 of the gauge 69 and is actuated by the section 61 of the glass ribbon so as to cause the placing in circuit of the motor 98 of the cutting device 63, and thus to initiate the scoring of the cutting line on the glass ribbon slightly bent over towards the cutting tool;

A second running button 203 (FIGURE 8), disposed in the control circuit of the contactor 200 and situated in an adjustable position in the path of the clamp 1 (or of the section 61 of the glass ribbon 62), so as to be actuated by the clamp 1, driven upwards by the section 61, and thus to produce, by the action of the contactor 200, the restarting of the motor 41 and therefore that of the rotation of the crank 35 in the direction of the arrow z (FIGURE 3), and therefore the displacement of the frame 9, carrying the clamp 1, from its position a (left-hand dead centre position) in the direction of the arrow y, and consequently a lateral translational movement of the section 61 in the direction of the arrow y and the cracking-off of the glass sheet 62 at the time when the cutting line reaches a point slightly above the level of the cracking-off roller 64, as also the continuation of the lateral translational movement in the same direction;

A contactor 500 (FIGURE 10), of which the running button 501, situated in a fixed position in the path of the crank 35, and the stop button 502 situated on the clamp 1 and controlled by an abutment 99 (FIGURE 1), are actuated respectively by the crank 35 and by the girder 71 of the tilting table 70 (FIGURE 6), thus initiating a sudden acceleration of short duration at the time of the cracking-off (or slightly before this instant), of the control of the upward movement of the cracked-off section, so as thus to prevent contact of its lower (cracking-off) edge with the upper edge of the new section of the glass ribbon continuing to rise from the drawing chamber;

A second stop button 204 (FIGURE 8) disposed in the control circuit of the contactor 200 is controlled by the abutment 99 disposed on the clamp 1 and actuated by the girder 71 of the tilting table 70 (FIGURE 6), so as to stop the drive of the section in the direction of the lateral translational movement indicated by the arrow y;

A running button 601 (FIGURE 11) controlled by the abutment 99 (FIGURE 1) actuated by the girder 71 of the tilting table 70 (FIGURE 6), so that it is actuated simultaneously with the stop button 204 (FIGURE 8), and thus initiates by the actuation of the rive-way electromagnetic valve 58 of the brake 45 (FIGURE 5) a braking and a progressive stopping of the lateral translational movement of the section in the direction of the arrow y, resulting in stoppage of the section at a predetermined point owing to the stopping of the frame 9 with the section 77 above the tilting device 70–76;

A running button 103 (FIGURE 7) controlled by the abutment 99, actuated by the girder 71 of the tilting table 70, so as to initiate the release of the section and its deposition in a tiltable position, by opening of the clamp 1 and the deposition of the glass sheet section 77 on the bracket 76 of the tilting table 70 (FIGURE 6), this deposition taking place in such manner that the upper edge of the section 77 remains engaged between the open jaws 2, 3 of the clamp 1 at the instant when the lower edge of the section 77 touches the bracket 76, and the clamp 1, continuing to rise, thereafter disengages the section 77 resting on the bracket 76;

A contactor 700 (FIGURE 12), of which the running button 701 is situated in a fixed position on the tilting table 70 in such manner as to be actuated by the pressure of the section 77 on the said table and thus to initiate the tilting of the cracked-off section, bringing the latter into a substantially horizontal position;

A running button 801 (FIGURE 11), situated in a fixed position in the path of the tilting table 70 in such manner as to initiate, under the action of the latter, the displacement of the electromagnetic valve 58 in the opposite direction to the preceding displacement, and thus the release of the braking means ensuring the progressive stopping of the lateral translational movement of the section in the direction of the arrow y;

A third running button 205 (FIGURE 8) disposed in the control circuit of the contactor 200 and situated in a fixed position in the path of the tilting table 70, so as to initiate under the action of the latter the return movement of the gripping device towards its initial position, that is to say, the return of the frame 9, with the empty, open clamp 1, towards the initial position of the frame 9 several centimeters from the left-hand dead centre position of its stroke in the direction of the arrow x (FIGURE 3);

Reversing member 403 (FIGURE 10) disposed in the circuit of the motor 19 and controlled by a contactor 404, of which the running button 405, as also a second running button 407 of the contactor 400, are situated in adjustable positions in the path of the frame 9 (FIGURE 3) so as to be successively actuated by the frame 9 during the return movement of the latter (arrow x), and thus to produce first of all the movement of the said reversing member 404 to the position for the opposite direction of running of the motor 19 and thereafter the actuation of the running button 407 and consequently the downward movement of the gripping device (open since the release of the section) towards its initial position;

A third stop button 206 (FIGURE 8) disposed in the control circuit of the contactor 200 and situated in an adjustable position in the path of the frame 9 (FIGURE 3) so as to be actuated by the latter at the end of its return travel and thus to produce the stopping of the translational movement of the gripping device in its initial position;

A second stop button 406 (FIGURE 10) in the control circuit of the contactor 400 and a stop button 408 in the control circuit of the contactor 404, both situated in adjustable positions in the path of the clamp 1 or of the sheet 62 (FIGURE 1), so as to be successively actuated by these latter and thus to initiate the stopping of the downward movement of the gripping devices when it reaches the (adjustable) level at which the fresh section is to be gripped and the reversing member 403 is to be returned to its initial position;

A running button 901 (FIGURE 13) disposed in the control circuit of a contactor 900 and a stop button 702 (FIGURE 12) disposed in the control circuit of the contactor 700, both situated in adjustable positions in the path of the tilting movement of the table 70 (FIGURE 6), so as to be successively actuated by the latter when it reaches a substantially horizontal position and thus to initiate the starting of the conveyor device, the stopping of the tilting movement of the tilting device when the latter reaches a substantially horizontal position, the consequent deposition of the cracked-off section of the conveying device and the discharge of the cracked-off section, if necessary accompanied by the automatic scoring of a number of cutting lines on the section, notably parallel to the direction of its discharge movement, for example in accordance with one or more of Patents Nos. 458,032, 458,267 and 458,290, belonging to the proprietors of the present invention;

A second running button 703 (FIGURE 12) and a third stop button 704 (FIGURE 12) disposed in the control circuit of the contactor 700, as also a stop button 902 disposed in the control circuit of the contactor 900, all three being situated in fixed positions in the path of the sheet situated on the table of the conveyor device (FIGURE 6, so as to be actuated by the said sheet and thus to initiate the tilting of the tilting device in the return direction, the optional stopping of the conveyor device and the stopping of the return tilting of the tilting device when the latter reaches its initial position.

The invention is not limited to the embodiments hereinbefore described and illustrated in the accompanying drawings. Many modifications may be made therein without departing from its scope.

We claim:

1. Apparatus for producing glass sheets comprising means for drawing a glass ribbon vertically from a molten glass bath by application of an upward feeding force applied to such ribbon along a transverse line located below the upper end of such ribbon, clamping means, means operable when the rising upper end of the ribbon has reached a given height above said feeding means to actuate said clamping means to grip such upper ribbon end, means spaced from one side of the glass ribbon in its normal path of feed for scoring a transverse cutting line on the associated surface of the ribbon, means spaced from the other side of the glass ribbon its normal path of feed for cracking-off the upper end portion of the glass ribbon above the cutting line applied to the ribbon, a horizontally movable frame carrying said clamping means, and means connected to said frame and including driving means for horizontally reciprocating said frame, and sensing means controlling said driving means and constructed and arranged to be operated when the gripped, rising end of the ribbon has risen above said given height to actuate said driving means to cause said frame to be moved horizontally in one direction to initially apply through said clamping means a force such as to bend said ribbon above said feeding means from its normal path of feed into engagement with said scoring means, said sensing means being then operated to actuate said driving means to cause said frame to be moved horizontally in the opposite direction to apply through said clamping means an opposite force such as to bend the ribbon above said feeding means back from its engagement with said scoring means and into engagement with said cracking-off means, said connected means being operable to cause said frame to continue its horizontal movement in said opposite cracking-off direction to move the gripped, freely suspended separated upper end portion of the glass ribbon away from the rising body of glass ribbon.

2. Apparatus such as defined in claim 1, in which said clamp operable means is constructed and arranged to be rendered operable by the rising upper end of the glass ribbon, and including means slidably supporting said clamping means for vertical movement on said frame, and means carried by said frame comprising a motor and mechanism connecting said motor to said clamping means, for exerting an upward pull on said clamp so that the latter cooperates with said feeding means in the upward feed of the glass ribbon while said upper end portion forms a part thereof.

3. Apparatus such as defined in claim 1, in which said clamping means comprises a pair of clamping jaws, provided on their sheet engaging portions with shock absorbing means, in which said clamp operable means comprises actuating means carried by one of said jaws and operable to actuate the other jaw, and means operable by the rising upper end of the glass ribbon for operating said actuating means to close the clamp jaws, and including means supporting said clamp jaws and said actuating means for slidable vertical movement on said frame.

4. Apparatus such as defined in claim 1, in which said connected means comprises a motor spaced from said frame along the line of horizontal movement thereof, driving mechanism connecting said motor to said frame, a first height indicating device carried by said frame and operable by the upper end of the glass ribbon to actuate said motor and driving mechanism to impart to said frame a small lateral displacement of short duration in said one direction from a normal position corresponding to the normal path of feed of the glass ribbon to cause said clamping means to force such ribbon into engagement with said scoring means, and a second height indicating device carried by said frame and operable by the upper end of the glass ribbon to actuate said scoring means to produce a cutting line on the glass ribbon while the latter is engaged therewith.

5. Apparatus such as defined in claim 1, in which said connecting means comprises a motor spaced from said frame along the line of horizontal movement thereof, driving mechanism connecting said motor to said frame, means associated with the upper end of the glass ribbon and operable when the latter reaches a given height to actuate said motor and driving mechanism to impart to said frame a lateral displacement in said opposite direction and such as to carry said clamping means from a position in which the ribbon is in engagement with said scoring means towards said cracking-off means to bring the ribbon into engagement therewith, a tilting table for receiving the separated upper end portion of the glass ribbon carried by said clamping means, and coactable means carried by said frame and titlting table to stop the movement imparted to said frame by said motor and driving mechanism.

6. Apparatus such as defined in claim 1, including means slidably supporting said clamping means for vertical movement on said frame, means carried by said frame comprising a motor and mechanism connecting said motor to said clamping means, and means operable to actuate said motor and connecting mechanism to impart to said clamping means while said frame is moving the latter in said opposite direction past said cracking-off means, an upward elevational speed greater than the speed of feed imparted to said ribbon by said feeding means to cause said clamping means to quickly remove the separated upper end portion of the glass ribbon from the area of the rising new upper edge of such ribbon.

7. Apparatus such as defined in claim 6, including a tilting table for receiving the separated upper end portion of the glass ribbon carried by said clamping means, and in which said means operable to actuate said motor and connecting mechanism comprises engageable means carried by said frame and tilting table and coactable on engagement thereof to initiate the actuation of said motor and connecting mechanism.

8. Apparatus such as defined in claim 1, including a tilting table for receiving the separated upper end portion of the glass ribbon carried by said clamping means, and in which said connecting means comprises a motor spaced from said frame along the line of horizontal movement thereof, driving mechanism connecting said motor to said frame, means associated with the upper end of the glass ribbon and operable when the latter reaches a given height to actuate said motor and driving mechanism to move said frame toward said tilting table, braking means connected to said driving mechanism and operable thereon to bring said frame to a stop, and coactable means carried by said frame and tilting table and operable to actuate said braking means to stop the horizontal movement of said frame when the severed upper end portion gripped by said clamping means is in position to be deposited on said tilting table.

9. Apparatus such as defined in claim 8, in which said clamp operating means is controlled by said coactable means and actuated by the latter when said upper end portion held in suspended relation by said clamping means is in position to be deposited on said tilting table to cause said clamping means to release its grip on such upper end portion to enable the lower edge of the latter to seat on said tilting table without said clamping means releasing its control of such upper end portion.

10. Apparatus such as defined in claim 9, in which said tilting table includes a supporting bracket for the deposited upper end glass portion, means for moving said table to a horizontal position, and means associated with said bracket for controlling said moving means and operable by the deposited upper end glass portion to initiate movement of said table to horizontal position.

11. Apparatus such as defined in claim 1, including a tilting table for receiving the separated upper end glass portion carried by said clamping means, means for moving said table to horizontal position, means for controlling said moving means and operable to initiate movement of said table to horizontal position when the upper end glass portion is deposited thereon, and means controlled by said table for controlling said connecting means and operable by the table to cause said connecting means to return said frame to its initial starting position over said upwardly rising glass ribbon.

12. Apparatus such as defined in claim 11, including means controlled by said frame for controlling said clamp operable means and actuated by said frame on its return movement to cause said clamp operable means to lower said clamping means toward its initial starting position while said frame is returning to its starting position.

13. Apparatus such as defined in claim 12, including a second means controlling said clamp operable means and operable by said frame when the latter reaches its initial starting position to cause said clamp operable means to stop the downward movement of said clamping means when the latter reaches its initial starting position.

14. Apparatus such as defined in claim 1, including a tilting table for receiving the separated upper end glass portion carried by said clamping means, means for moving said table to horizontal position, means for controlling said moving means and operable to initiate movement of said table to horizontal position when the upper end glass portion is deposited thereon, a conveyor associated with said tilting table and including means for moving the same, and control means operable by said table to stop the movement of the latter by said table moving means and to initiate the operation of said conveyor moving means.

15. Apparatus such as defined in claim 14, including a control device associated with said conveyor and operable by the upper end glass portion conveyed by the latter to cause said table moving means to return said tilting table to its starting position.

16. Apparatus such as defined in claim 1, including a tilting table for receiving the separated upper end glass portion carried by said clamping means and having glass sheet supporting surfaces engageable with one side of such glass portion, means controlled by the depositing of such glass portion on said table for moving the latter to horizontal position, a conveyor mounted with said tilting table and including means for moving the same, said table and conveyor being constructed and arranged to come into telescoping relation as the table is moved to horizontal position so that the plate conveying surface of said conveyor is located above the sheet supporting surfaces of said table in the horizontal position of said table and automatically lifts the glass portion from such supporting surfaces as the table moves to horizontal position, and control means operable by said table to initiate the operation of said conveyor moving means to cause said conveyor to remove from the area of said table the glass portion transferred thereto.

References Cited by the Examiner

UNITED STATES PATENTS

| 1,564,267 | 12/25 | Owen | 65—194 |
| 1,931,700 | 10/33 | Murphy et al. | 65—193 |
| 2,756,545 | 7/56 | Atkeson | 225—2 |

FOREIGN PATENTS 650,177 2/51 Great Britain.

DONALL H. SYLVESTER, *Primary Examiner.*

ARTHUR P. KENT, *Examiner.*